United States Patent [19]

Pickup et al.

[11] Patent Number: 5,442,774
[45] Date of Patent: Aug. 15, 1995

[54] MICROPROCESSOR CONTROLLER WITH AUTOMATIC CLOCK-RATE SWITCHING

[75] Inventors: Ray L. Pickup, Brush Prairie; Mark R. Thackray, Vancouver, both of Wash.

[73] Assignee: Hewlett-Packard Company, Palo Alto, Calif.

[21] Appl. No.: 122,790

[22] Filed: Sep. 16, 1993

[51] Int. Cl.⁶ ............... G01D 15/16; H03K 21/02; H03K 5/19; G06F 11/00
[52] U.S. Cl. ..................... 395/550; 377/48; 377/111; 377/114; 377/20; 371/14; 371/62; 327/114; 327/115
[58] Field of Search ............ 395/550; 268/201; 375/575, 106; 364/DIG. 1, 520; 377/48.2

[56] References Cited

U.S. PATENT DOCUMENTS

| | | | |
|---|---|---|---|
| 4,400,817 | 8/1983 | Sumner | 375/119 |
| 4,460,972 | 7/1984 | Homan et al. | 364/900 |
| 4,631,659 | 12/1986 | Hayn et al. | 364/200 |
| 4,656,649 | 4/1987 | Takahashi | 377/48 |
| 4,686,386 | 8/1987 | Tadao | 307/269 |
| 4,819,164 | 4/1989 | Branson | 364/200 |
| 4,885,538 | 12/1989 | Hoenniger, III et al. | 324/312 |
| 4,926,445 | 5/1990 | Robb | 375/106 |
| 4,930,090 | 5/1990 | Kimura et al. | 364/520 |
| 4,931,712 | 6/1990 | DiGiulio et al. | 318/625 |
| 4,951,301 | 8/1990 | Zulian | 377/54 |
| 5,022,395 | 6/1991 | Russie | 128/419 |
| 5,025,387 | 6/1991 | Frane | 364/493 |
| 5,093,667 | 3/1992 | Andricos | 342/372 |
| 5,175,751 | 12/1992 | Heaney et al. | 377/2 |
| 5,197,016 | 3/1993 | Sugimoto et al. | 364/490 |
| 5,212,715 | 5/1993 | Pickert et al. | 375/114 |
| 5,265,243 | 11/1993 | Povenmire et al. | 395/550 |
| 5,325,521 | 6/1994 | Koyama et al. | 375/575 |
| 5,327,404 | 7/1994 | Nolan | 268/201 |

Primary Examiner—Kevin A. Kriess
Assistant Examiner—Majid A. Banankhah

[57] ABSTRACT

A printer controller employs a microprocessor together with an application-specific-integrated-circuit (ASIC) to manage the operation of the printer. Among its functions, the ASIC manages memory access for the microprocessor. Either fast- or slow-clock microprocessors may be installed in the controller, but the ASIC requires a slow clock. When a fast-clock microprocessor is installed, the ASIC must divide the clock frequency to provide its own (slow) clock. Likewise, the use of a fast-clock microprocessor requires the ASIC to insert memory-cycle WAIT times, whereas a slow-clock microprocessor needs no WAITs. In a preferred embodiment of the invention, provision is made, during initial power-on RESET, to inform the ASIC which clock speed is being used. This information is conveyed by the configuration of the WAIT interconnection between ASIC and microprocessor, thus eliminating the need for a dedicated ASIC pin for this purpose.

7 Claims, 1 Drawing Sheet

MICROPROCESSOR CONTROLLER WITH AUTOMATIC CLOCK-RATE SWITCHING

FIELD OF THE INVENTION

The present invention relates in general to microprocessor-based systems and, in particular, for systems capable of operation at two clock speeds, to hardware-saving means of sharing LSI connection pin functionality.

BACKGROUND OF THE INVENTION

Many types of electronic equipment have incorporated microprocessor-based controllers to manage their ever-increasing complexities of operation. Such types include electronic instruments, electronic consumer devices, and printers and plotters as computer accessories, to name just a few. The controllers receive commands from the user, display information, store data, communicate with other devices including computers, and manage the operation of the apparatus in which they reside.

A typical controller will include a microprocessor and a goodly amount of support circuitry, much of it required by the nature of the specific equipment. For instance in a printer—the technical area of the genesis of the present invention—some support circuitry is dedicated to interfacing with motors, print heads, and position sensors. Other circuits are assigned to user information display, others to memory access for the microprocessor, and yet others to serial and/or parallel data transfer with the outside world, and so on.

For reasons of economy and compactness, a common practice is to combine most of this peripheral circuitry into a single application-specific-integrated-circuit (ASIC). An ASIC normally has many connection pins, some for communication with the microprocessor and others for connecting to the various parts of the apparatus.

Designers of the controller must allow for variations in the environment in which the controller finds itself. To function properly, the controller and the ASIC must determine the features and conditions of the environment in which they will operate. One way to do this is to have a power-on initialization routine, during which the controller reads the state of certain switches and jumpers, etc, into a configuration register where the environment information will be available.

Among the variations that must be accomodated is the use of either fast-clock or slow-clock versions of the microprocessor. This may be due to parts availability considerations, to electromagnetic interference considerations, or to widely differing features of the printer models into which the controller is installed. The ASIC, however, is only capable of operating with a slow clock, yet it cannot have its own separate clock, since it must work synchronously with the microprocessor. The ASIC could divide the frequency of a fast clock, if such is needed by the microprocessor, to obtain a slow clock for its own use. But it must be configured at the start of operation to divide the clock input. Unfortunately, information to determine clock division cannot be included in the initialization data to be read in, since reading and storing this data requires the clock to be functioning already. In situations like this, the customary solution is to assign one of the ASIC connection pins for this purpose, and to set the logic state of the connection by a switch or equivalent. This allows the ASIC to configure its clock input appropriately when power is applied. However, IC connection pins are a valuable resource to the designer, and it is desirable to find another method to inform the ASIC of the clock requirement.

SUMMARY

The present invention disclosed and claimed herein includes a microprocessor-based system with a central microprocessor controlling the system. Various other electronic circuits cooperate with the microprocessor to perform actions such as motor control and data input/output. In one embodiment of the invention, many of these circuits are collected into a single application-specific-integrated-circuit, or ASIC. Both the microprocessor and the ASIC require a digital clock for pacing sequences of operations and for synchronizing the cooperation between microprocessor and ASIC.

External considerations mandate that the system be usable with either a fast-clock or a slow-clock version of the microprocessor. However, the ASIC functions only with a slow clock. The ASIC contains a clock divider circuit which can reduce a fast-clock signal to a slow clock for its own use. This divider must be enabled or disabled, as required by the clock speed, before the system begins operating normally after power-on RESET. In addition, the use of a fast-clock microprocessor requires the insertion of WAIT cycles when it accesses program memory. Such WAITs are not required for a slow-clock version. The ASIC contains logic circuitry for managing the WAIT function, and there is a WAIT control connection between the ASIC and the microprocessor for this purpose. This embodiment takes advantage of the fact that WAITs are required for the fast-clock microprocessor and not for the slow. Accordingly, the WAIT interconnection is enabled in the case of a fast-clock microprocessor and disabled otherwise. During the power-on RESET time (before memory accesses begin), a circuit in the ASIC senses and stores the state of the WAIT interconnection and this information is used to control the clock divider so that it is properly configured at the end of RESET, when normal operation of the system begins.

By conveying the information respecting the fast/slow clock through the status of the WAIT interconnection, this embodiment of the invention avoids the need to assign a special ASIC connection pin for this purpose.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
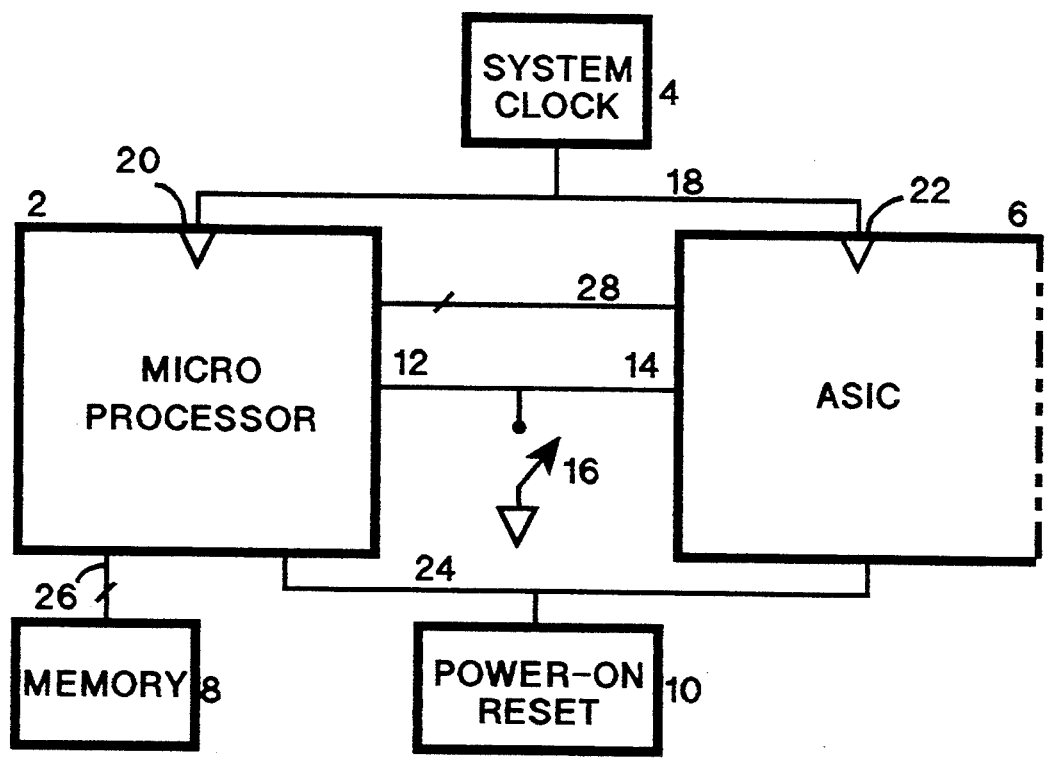
FIG. 1 illustrates a block diagram of a system in accordance with the present invention.

Referring now to FIG. 1, there is illustrated a microprocessor-based system utilizing the clock speed notification technique of the present invention. The system is used as a controller for a printer which receives information about material to be printed from an outside source, usually a computer. There are numerous tasks for the system to perform, such as operating the motors which position the paper and the ink cartridge, monitoring a user control panel and sending annunciator information thereto, receiving serial or parallel information from the outside source, and various other tasks.

Microprocessor 2 is connected through a multiwire interconnection 26 to a memory 8, in which reside various instructions and data for operating the system, together with buffered, printable data. Microprocessor 2 is also connected through another multiwire interconnection 28 to the application-specific-integrated-circuit (ASIC) 6. In ASIC 6 are located most of the control circuits needed by microprocessor 2 to operate the printer in accordance with operating parameters set by the user and with data arriving from an external source, such as a computer. For example, there is a control and annunciator panel (not shown) on the printer housing, by which the user can choose a font size for printing. ASIC 6 contains circuits for sensing a button push on this panel and for conveying the identity of the button to the microprocessor 2. Instructions stored in memory 8 enable the microprocessor to identify the font requested and to access the data representing the printhead and paper roller actions needed to print characters using this font. However, a description of this and many other tasks is not necessary for a full understanding of the preferred embodiment of the invention, and they are therefore not discussed further here, nor illustrated in the drawings. The right side of block 6 representing the ASIC is shown dotted to indicate the existence of other control circuits in the ASIC not required to be shown for understanding the present embodiment.

A system clock 4 supplies the pacing and synchronizing signals required by the microprocessor 2, ASIC 6, and other circuits not shown. Microprocessor clock input 20 and and ASIC clock input 22 receive the system clock output on line 18. In some versions of microprocessor 2, much of the circuitry for system clock 4 is physically located with the microprocessor. However, the functions of the microprocessor and the clock are distinct, and system clock 4 is shown as a separate block.

Figure 2:
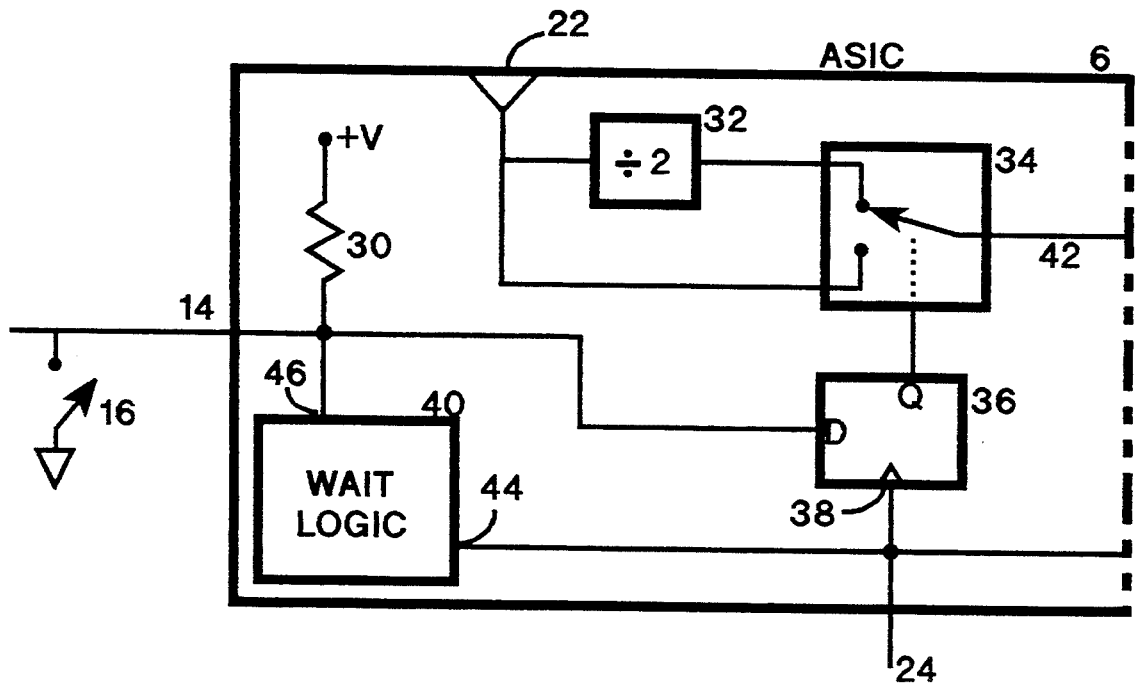
FIG. 2 expands a portion of FIG. 1, showing some details therein.

It will now be instructive to refer also to FIG. 2, which is an expanded diagram of the ASIC, displaying circuits and circuit blocks which are pertinent to the preferred embodiment.

Memory-cycle WAIT generator logic 40 is connected, via WAIT output 14, to the microprocessor WAIT control input 12. However, this interconnection depends upon switch 16, which, when closed, grounds the interconnection. The WAIT circuitry is important in this embodiment and will be discussed in detail below.

Lastly, there is a power-on RESET circuit 10 whose function is to sense when power is first applied to the printer and to generate a LOW-level logic pulse of about 50 milliseconds duration after the power is applied. This pulse is coupled, via RESET output 24, to microprocessor 2, ASIC 6, and other circuits not shown. The purpose of RESET is twofold: to provide the time needed for the decay of turn-on transients of printer circuits and to insure that all circuits begin to operate cooperatively in a known, predetermined state. Normal printer operation, including any required initialization routines, begins just after the trailing (positive) edge of the RESET pulse.

Returning to microprocessor 2, in this embodiment one of two versions of a Z-80 microprocessor, manufactured by Zilog, Inc, is usable. Normally, a fast version using an 8 MHz clock is installed. However, for flexibility during design and production, it is necessary to allow for the use of a slower version of the microprocessor, using a 4 MHz clock. In some cases, this same flexibility is necessary if the controller is to be used over a range of products, with wide variations of both price and performance. The interchangability of the two versions of microprocessor is desirable without requiring major changes in the controller construction.

When the 8 MHz clock (fast) version of the microprocessor is used, the cycle time (the inverse of the 8 MHz clock frequency) is short enough that the memory 8 may not reliably respond to access requests by the microprocessor within the time it expects. Accordingly, additional time is provided for the memory to respond by the use of WAIT logic 40. The use of a WAIT circuit is a common practice in microprocessor usage whenever memory (either ROM or RAM) is slower than the response time expected by the microprocessor. Basically, WAIT logic 40 monitors memory access requests by the microprocessor; a signal for this purpose is contained in interconnection 28, but is not individually shown in the figure. When such a request occurs, WAIT logic 40 sends a signal from the ASIC WAIT output 14 to the microprocessor WAIT input 12. This signal causes the microprocessor to idle for one or more clock cycles, thus giving memory 8 additional time to respond and increasing the reliability of the memory access.

When a slow version of the microprocessor is installed in the controller, the cycle time is doubled and a WAIT signal is not needed. There is adequate time available for the memory to respond.

An additional complication derives from this need to adapt to either a fast or a slow version of the microprocessor: ASIC circuits can operate only at the slow (4 MHz) clock speed. Since the frequency of the system clock 4 is adjusted to conform with the installed microprocessor, provision must be made for a slower ASIC clock when a fast microprocessor is used. It might be thought that a way to do this is simply to provide the ASIC with its own (slow) clock. This is unsatisfactory, since two independent clocks would not be synchronous due to clock frequency tolerances and drifts. It is essential that the relationships among the transition times of both microprocessor and ASIC clocks be unvarying. For this reason, deriving a slow ASIC clock by dividing the frequency of the fast microprocessor clock is a proper solution, as this will provide for just such a fixed time relationship. A divider 32 is provided for this purpose. Provision must also be made, however, to bypass divider 32 when a slow microprocessor clock is used. This function is accomplished by data selector 34, shown symbolically as a SPDT switch. Data selector 34 is controlled by the output Q of flip-flop 36. ASIC clock line 42 is the output of data selector 34, and is distributed throughout the ASIC where needed, although this is not shown in the figure.

How data selector 34 is operated to provide the proper ASIC clock frequency is now explained.

Returning to the WAIT connection 14 - 12, it will now be apparent that this interconnection is needed when a fast microprocessor is used, but should be disabled when a slow microprocessor is installed. Switch 16 serves this purpose. When a fast microprocessor is installed, an 8 MHz system clock is also installed, and switch 16 is set open. Likewise, for a slow microprocessor, a 4 MHz system clock is installed, and switch 16 is set closed. (For clarity, a switch symbol is used for switch 16. However, with equal validity, the switching function can be achieved with a printed circuit modification, or any other equivalent physical connection.)

With this background, it can now be seen what the action of the switch 16 will accomplish. Consider the case when it is open, leaving the interconnection 12 - 14 undisturbed; this will be its configuration for a fast microprocessor and an 8 MHz system clock. Since line 12 is attached to the WAIT input in the microprocessor, it is high impedance. Likewise, at the line 14 end, the D input to flip-flop 36 is also high impedance. WAIT logic block 40 receives a RESET pulse on input 44 from the ASIC RESET connection 24. WAIT logic 40 is designed so that its output 46 is open-circuit during the time of the RESET pulse. Therefore, there are no low impedance connections on line 14 other than pullup resistor 30, and so the voltage will be a logic HIGH, since pullup resistor 30 is connected to the logic supply +V. Flip-flop 36 is arranged to trigger on a positive clock edge, and since its clock input is connected to RESET line 24, it will store a logic HIGH at the trailing edge of this pulse. Data selector 34, controlled by flip-flop 36, is arranged to connect to its upper input, as shown in the figure, for a HIGH control input. This will result in the input clock 22 being routed through the divider 32, so that the ASIC clock line 42 will distribute 4 MHz for the remainder of the time the printer is powered.

In the case of a slow (4 MHz) system clock and microprocessor, switch 16 will be closed. This action will decouple the WAIT logic from the microprocessor, and will cause a logic LOW to be stored in flip-flop 36 at the end of the RESET pulse. Hence, flip-flop 36 will cause data selector 34 to bypass divider 32 and the ASIC clock line 42 will distribute the 4 MHz signal, as desired. Also, in this case, output 46 of the WAIT logic will not be enabled to function.

Because the ASIC clock processing configuration must be set up by the end of the RESET pulse, it cannot be done by an initialization routine, which would require the microprocessor to be operating. The alternative normally used to solve this problem is to assign a special ASIC connection pin coupled to data selector 34. The logic signal on this pin would probably be set by a second pole on switch 16. However, dedicating a scarce pin for this purpose would require the sacrifice of some other function, and so this embodiment of the invention has avoided the need for such a special pin.

We have described and illustrated the principles of our invention with reference to a preferred embodiment; however, it will be apparent that the invention can be modified in arrangement and detail without departing from such principles. It will be recognized that the detailed embodiment is illustrative only, and should not be taken as limiting the scope of our invention. Rather, we claim as our invention all such variations as may fall within the Scope and spirit of the following claims and equivalents thereto.

We claim:

1. A microprocessor-based control system comprising:
    a microprocessor having a fast operating mode, a slow operating mode a first clock input, and a WAIT control input;
    a system clock coupled to the first clock input, and capable of fast and slow operation according to the operating mode of the microprocessor;
    a control circuit, requiring a slow clock comprising:
        a clock-divider, having a second clock input coupled to the system clock, an output, and a data selector input;
        WAIT logic having a pulled-HIGH WAIT output coupled to the WAIT control input and to the data selector input, the WAIT output being grounded when the microprocessor is in its fast operating mode;
    whereby the clock-divider is configured, by its data selector input, to supply a divided or non-divided clock signal at the clock-divider output according to the state of the WAIT output.

2. A control system as recited in claim 1, in which the clock-divider is responsive to the state of the WAIT output only during a power-on RESET time.

3. A control system as recited in claim 2, the clock-divider further including a storage register for storing the state of the WAIT output;

4. A control system as recited in claim 3, in which the control circuit comprises a single integrated circuit.

5. In a microprocessor-based control system comprising a microprocessor, a WAIT logic circuit having a pulled-HIGH output, and control circuitry, the microprocessor having a fast operating mode using a fast clock and memory WAIT cycles, and a slow operating mode using a slow clock, the control circuitry requiring a slow clock and having a configurable clock-divider circuit for dividing a fast clock, a method for supplying a clock to the control circuitry comprising the steps of:
    providing a connection between the WAIT logic circuit and the microprocessor;
    grounding the connection provided by the previous step when the microprocessor is using its slow operating mode;
    sensing, with a sense circuit, the logic state of the connection;
    storing, in a storage register, the logic state sensed in the previous step;
    configuring the clock divider circuit according to the stored logic state to divide a fast clock or to pass a slow clock undivided.

6. A method for supplying a clock to control circuitry, as recited in claim 5, in which the sensing step is carried out during a power-on RESET interval.

7. A method for supplying a clock to control circuitry, as recited in claim 5, including the further step of combining the WAIT logic circuit, the sense circuit, and the control circuitry in an ASIC.

* * * * *